June 30, 1931. O. J. KUENHOLD 1,812,346
THERMOSTATIC VALVE MECHANISM
Original Filed Oct. 16, 1925  2 Sheets-Sheet 1
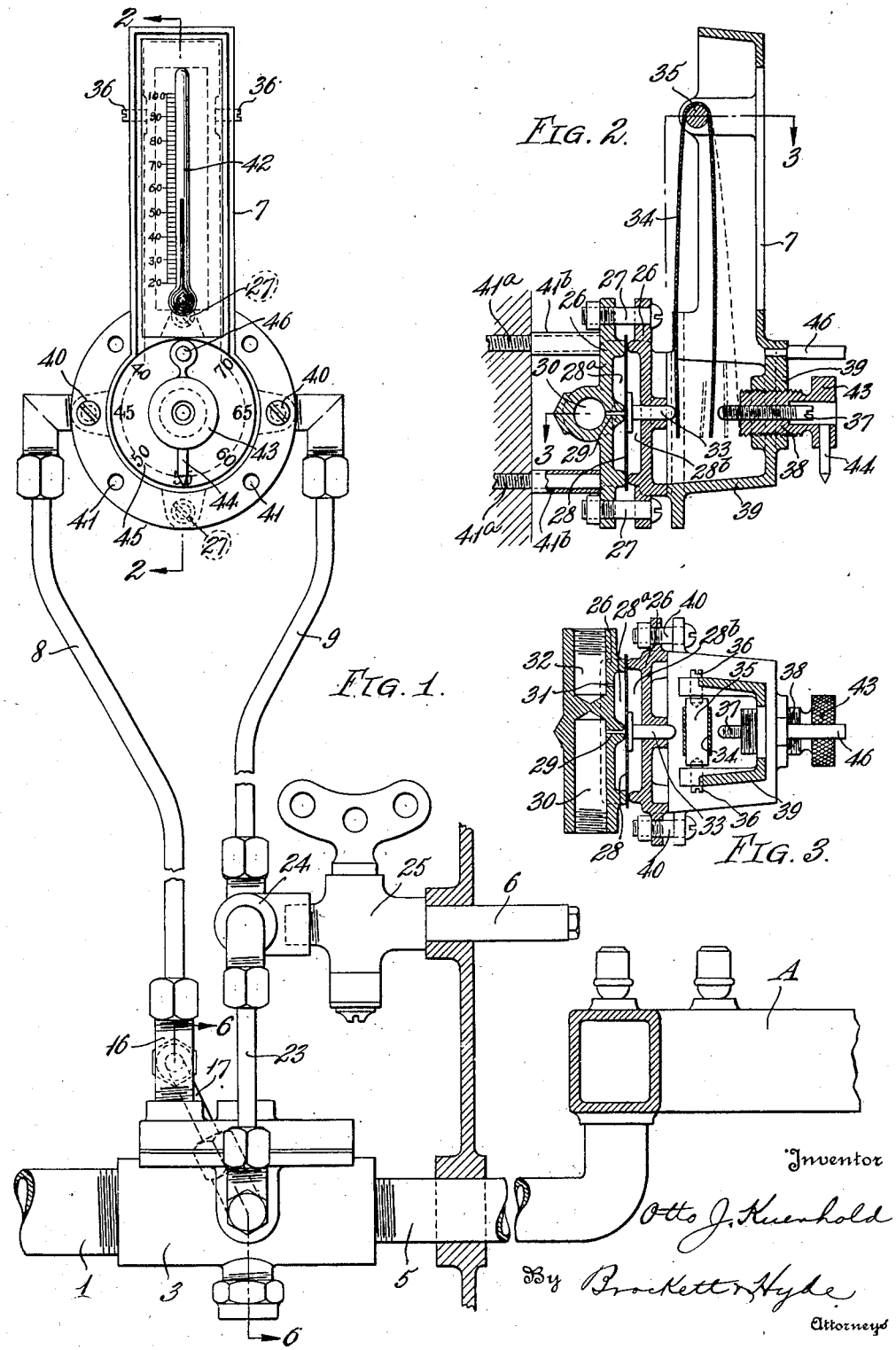

June 30, 1931.　　O. J. KUENHOLD　　1,812,346
THERMOSTATIC VALVE MECHANISM
Original Filed Oct. 16, 1925　　2 Sheets-Sheet 2

Inventor
Otto J. Kuenhold
By Brockett & Hyde
Attorneys

Patented June 30, 1931

1,812,346

UNITED STATES PATENT OFFICE

OTTO JOHN KUENHOLD, OF CLEVELAND, OHIO, ASSIGNOR TO H. M. SHRER COMPANY, OF QUINCY, ILLINOIS, A CORPORATION OF ILLINOIS

THERMOSTATIC VALVE MECHANISM

Application filed October 16, 1925, Serial No. 62,836. Renewed November 24, 1930.

This invention relates to thermostatic valve mechanisms, such as are employed for controlling the flow of gas to a burner, such as a garage burner, or a heater for any room or space, or for other like uses.

The object of the invention is to provide an arrangement of this kind in which the pressure of the gas supply serves as the source of power for actuating the controlling valves, but nevertheless under the control or influence of a thermostat subject to the temperature of the room or space to be heated, and which mechanism is so arranged and is of such form as to enable the controlling thermostat to be conveniently located at practically any reasonable distance from the valve mechanism and particularly from those valves or other parts which necessarily must be at or near the burner.

A further object of the invention is to provide mechanism of the class described which is of simple construction and capable of convenient adjustment and in which all parts are easily accessible for repair or inspection purposes.

A further object of the invention is to provide an arrangement of this kind which embodies means for maintaining at the burner a pilot light of what may be termed minimum size, together with valve mechanism thermostatically controlled and arranged upon a reduction of temperature to first build up the size and strength of the pilot flame and then increase the flow of the gas to the main burner, so as to avoid flare backs and possible blowing out of the pilot flame.

A further object of the invention is to provide a controlling valve mechanism embodying movable abutment means, such as a diaphragm, subject on one side to the pressure of the gas supply and on its opposite side to the effect of a thermostat or thermostatically controlled device, said abutment either serving as a valve or constituting a valve which functions as a relay or controlling device for other mechanism which regulates the flow of gas to the burner.

Further objects of the invention are in part obvious and in part will appear more in detail hereinafter.

Figure 4:
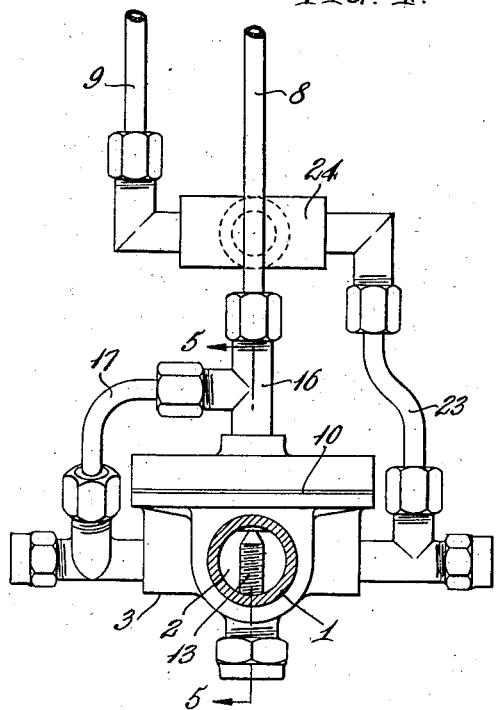
Figure 5:
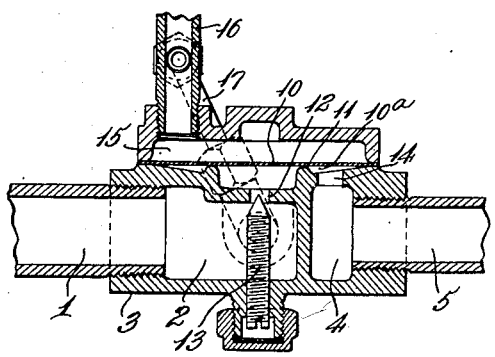
Figure 6:
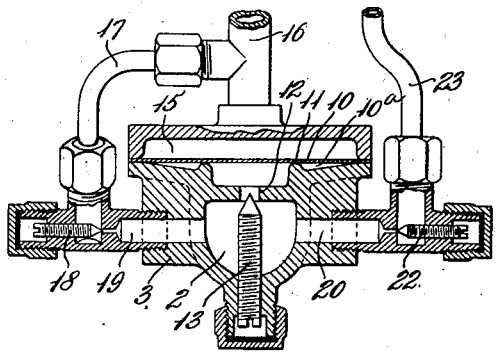

In the drawings, which represent one suitable embodiment of the invention, Fig. 1 is an elevation of the entire apparatus, the thermostat or wall instrument being shown in front view; Fig. 2 is a detail sectional elevation on the line 2—2, Fig. 1; Fig. 3 is a detail sectional plan view on the line 3—3, Fig. 2; Fig. 4 is a front elevation of the main valve mechanism; Fig. 5 is a sectional elevation thereof on the line 5—5, Fig. 4; and Fig. 6 is a sectional elevation thereof on the line 6—6, Fig. 1.

In the drawings, 1 indicates the main gas supply pipe equipped with an ordinary shut off cock, not shown, and communicating with a gas supply chamber 2 in the casing 3 of the gas controlling valve, from the outlet chamber 4 of which a conduit 5 conveys the gas to a burner A of any suitable form. The details of the valve mechanism will be later described. Associated with the main gas valve are a pilot burner 6 and wall instrument or thermostatic regulator marked generally 7. The main gas valve and pilot are, of course, located at or closely adjacent to the burner or heater, while the wall instrument may be designed for attachment to any suitable support and is shown as designed for attachment to the wall. It is connected to the mechanism at the burner by two conduits 8, 9, which may be small flexible metal tubes a quarter of an inch or less in diameter and of any convenient length, each of said tubes being even as long as 20 to 30 feet. This enables the heater to be placed in one part of the room and the regulator at a distant point.

Referring now to the main gas valve, said valve includes not only the supply and discharge chambers 2 and 4, before referred to, but also a valve chamber in which is a diaphragm 10, a portion of which cooperates with the seat 11 around a port or opening 12 communicating with the supply chamber 2 capable of more or less restriction by the needle valve 13, as will be understood. In a wall of the casing the chamber 10ª below the diaphragm communicates through a port 14 with the outlet chamber 4.

The diaphragm 10 serves by its cooperation with seat 11 as a valve for controlling the flow of the main gas supply from the supply chamber 2 to the discharge chamber 4 and thence to the burner. Said diaphragm valve is controlled by the pressure in the chamber 15 above it, which communicates with a T 16, one branch of which communicates by a pipe 17 and an adjustable needle or bleed valve 18 with a passage 19 communicating with the supply chamber 2. The other branch of said T communicates by way of the pipe 8 with the wall instrument. Supply chamber 2 also communicates by way of a passage 20, an adjustable needle valve 22 and pipe 23 with a T 24, one branch of which communicates by way of a valve or cock 25 with the pilot burner 6, while the other branch communicates with the pipe 9 leading to the wall instrument.

The wall instrument comprises a suitable casing including hollow back members 26 between which is a chamber and which members are clamped together by the bolts 27 which also clamp in place a diaphragm valve 28 controlling a port 29 leading from a passage 30 to which the pipe 8 is connected, the chamber 28$^a$ beneath the diaphragm also communicating by a restricted port 31 and a passage 32 with the pipe 9 before referred to. In the chamber 28$^b$ above the diaphragm is a plunger 33 connected thereto and slidable in a boss of the casing, the outer end of said plunger abutting one arm of a U shaped bimetallic thermostatic element 34 so arranged that its arms will open and close with variations in temperature. Said member 34 at its bend is mounted upon a bar 35 carried in adjustable pivot pins 36, so that the thermostatic element floats or turns bodily, as it were, on said pivots, with its arms also free for relative motion by expansion and contraction. The outer arm of said member abuts an adjustable screw 37 threaded by fine pitch threads into a sleeve 38 which in turn is threaded by coarse pitch threads into a cover 39 attached to the back frame parts by bolts 40 and which cover is provided with openings 41 through which securing devices, such as screws 41$^a$, may pass through the spacer tubes 41$^b$ into the wall and also encloses the member 34. The cover, if desired, may also support a thermometer 42. Screw 37 serves as a fine adjustment for the temperature and screw 38 as a more coarse adjustment, screw 37 being slotted and screw 38 being provided with a knurled head 43 for manipulation by the fingers and with a pointer 44 travelling over a scale 45 indicating temperatures, 46 being a stop for said pointer.

The operation is as follows:

Let us assume that diaphragm 10 lies against its seat 11, shutting off the flow of gas to the burner, due to the fact that the temperature is at or above the desired minimum. Under such conditions pressure from the supply line 1 flows through the passage 19 by way of valve 18 and conduit 17 to the chamber 15 above the diaphragm 10, so that the supply pressure is effective on the upper side of said diaphragm over its entire area and preponderates over the pressure within the seat 11 on the lower face of the diaphragm. The supply pressure therefore holds the valve closed. Pressure also flows by way of passage 20 and valve 22 to the pilot burner 6 and will tend to flow by way of pipe 9 to the chamber beneath the diaphragm on the wall instrument, but the latter diaphragm is held against its seat by the expansion of the thermostatic element 34 effective upon plunger 33. Therefore, gas merely flows out through the pilot burner 6, it being understood that valve 22 is adjusted so that the pilot flame under the conditions stated is a minimum, merely a small bead of flame. Pressure likewise tends to flow from the conduit 17 by way of conduit 8 to the supply side of the valve in the wall instrument, but again the flow of such pressure is prevented by the seating of the valve diaphragm 28.

If now the temperature in the region of the thermostatic regulator drops below the minimum to which the same is adjusted the reduced temperature causes the arms of the thermostatic element 34 to approach each other, permitting plunger 33 to move over and the valve diaphragm 28 to leave its seat. The seat around the port 29 is made rather small and port 29 is small and port 31 still smaller. Consequently as soon as there is the slightest tendency for the diaphragm 28 to move, it promptly leaves its seat and a puff of pressure from the supply line by way of pipe 8 rushes out through the port 29 and fills the chamber 28$^a$ beneath the diaphragm. This puff or wave of pressure promptly flows through port 31 and by way of conduit 9 to the pilot burner 6, where it rushes out and immediately increases the length of the pilot flame to, say two or three inches.

The puff or wave of pressure flowing to and through port 29 and thence to the pilot burner comes more immediately from the evacuation of the chamber 15 above the diaphragm 10, due to the fact that valve 18 is adjusted to permit only a slightly increased flow of gas therethrough over what flows past the valve 22, so that the pressure flows away from the chamber 15 more rapidly than it can flow into conduit 17 from the passage 19. Evacuation of the chamber 15 reduces the pressure therein and main supply pressure effective through the port 12 upon the lower face of diaphragm 10 lifts said diaphragm from its seat and thereby produces a wide opening from the supply chamber 2 through port 12 and chamber 10$^a$ and by way of port 14 to the pipe 5 connected to the burner. The gas thus supplied to the burner is ignited by the increased pilot flame, as will be readily understood.

The burner continues to burn under the conditions described with the pilot burner supplied by way of valve 22 with a quantity of gas sufficient for its maximum flame condition until the temperature in the region of the wall instrument or regulator rises above the desired limit, thereby causing the arms of the element 34 to separate and force the diaphragm valve 28 to its seat. Such operation permits pressure supplied through the passage 19 and by way of valve 18 to build up in the pipe 8 and in the chamber 15 above diaphragm 10, thereby moving said diaphragm to its seat 11 and shutting off the supply of gas to the main burner. Likewise, the flow of gas through the port 29 to the pilot burner has been shut off by the diaphragm 28, so that the only gas now supplied to the pilot comes by way of valve 22, which resumes its former minimum flame condition.

Adjustment of the screw 37 may be effected by a screw driver applied thereto through an opening in the head 43. This screw is adjusted at the initial setting of the valve and ordinarily is allowed to remain so set. Adjustment of the head 43 enables the operator to quickly raise or lower the temperature to be maintained in the room.

The valve mechanism described is of relatively simple construction and provides not only for minimum and maximum pilot burner conditions, but also enables the flow of gas to be regulated within narrow limits, even as close as two degrees Fahrenheit, by an instrument located at some distance from the burner. In practice the balancing of the effect of the thermostatic element against the pressure beneath diaphragm 28 is such that the diaphragm practically flutters on its seat and as soon as pressure rushes through the port 29 and becomes effective over the entire lower area of diaphragm 28, it moves the diaphragm away from its seat rapidly and with an impulse which, of course, moves the arms of member 34 toward each other. The result is a desirable snap action with practically no waste of gas.

What I claim is:

1. Thermostatic control mechanism for gas burners, comprising a gas burner, controlling valve mechanism therefor including a single flexible imperforate diaphragm valve operated by gas pressure directly thereon, relay valve mechanism also including a single flexible imperforate diaphragm valve and adapted for cooperation with said controlling valve mechanism, and a thermostatic element effective upon said relay valve mechanism.

2. Thermostatic control mechanism for gas burners, comprising a gas burner, a gas supply conduit, a pair of gas receiving chambers adapted for intercommunication through a port therebetween, one of said chambers being in communication with said gas supply conduit and the other said chambers being in communication with said gas burner, a plurality of independently operable valves cooperating with said port for controlling communication between said gas chambers, relay valve mechanism adapted for cooperation with one of said valves, and a thermostatic element cooperating with said relay valve mechanism.

3. Thermostatic control mechanism for gas burners, a gas supply conduit, a pair of gas receiving chambers adapted for intercommunication through a port therebetween, one of said chambers being in communication with said gas supply conduit and the other of said chambers being in communication with said gas burner, a pair of valves cooperating with said port for controlling communication between said gas chambers, one of said valves being of the flexible diaphragm type and adapted for automatic operation and the other of said valves being adapted for manual operation, relay valve mechanism adapted for cooperation with one of said valves, and a thermostatic element cooperating with said relay valve mechanism.

4. Thermostatic control mechanism for gas burners, comprising a main gas burner, a gas supply conduit therefor, a flexible imperforate diaphragm valve controlling the flow of gas from said conduit to said burner, a pair of gas receiving chambers separated by said imperforate diaphragm valve but remaining at all times in communication with each other so that gas can flow from one chamber to the other, relay valve mechanism adapted for cooperation with said diaphragm valve, and a thermostatic element effective upon said relay valve mechanism.

5. Thermostatic control mechanism for gas burners, comprising a main gas burner, a gas supply means therefor, a flexible imperforate diaphragm valve controlling the flow of gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and immovable third conduit means for delivering gas to said pilot burner from the other of said chambers.

6. Thermostatic control mechanism for gas burners, comprising a main gas burner, a gas supply means therefor, a flexible imperforate diaphragm valve controlling the flow of gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and third conduit means for delivering gas to said pilot burner from the other of said chambers, said third conduit means including a flexible diaphragm valve for controlling the flow of gas therethrough.

7. Thermostatic control mechanism for gas burners, comprising a main gas burner, a gas supply means therefor, a flexible imperforate diaphragm valve controlling the flow of gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and third conduit means for delivering gas to said pilot burner from the other of said chambers, said third conduit means including a thermostatically controlled valve for controlling the flow of gas therethrough.

8. Thermostatic control mechanism for gas burners, comprising a main gas burner, a gas supply means therefor, a flexible imperforate diaphragm valve controlling the flow of gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and third conduit means for delivering gas to said pilot burner from the other of said chambers, each of said conduit means being provided with a valve for controlling the flow of gas therethrough.

9. Thermostatic control mechanism for gas burners, comprising a main gas burner, a gas supply means therefor, a flexible imperforate diaphragm valve controlling the flow of gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and third conduit means for delivering gas to said pilot burner from the other of said chambers, each of said conduit means being provided with a valve for controlling the flow of gas therethrough, the valve of one of said conduit means being thermostatically operated and the valves of the other two conduit means being manually operated.

10. Thermostatic control mechanism for gas burners, comprising a main gas burner, a gas supply means therefor, a flexible imperforate diaphragm valve controlling the flow of gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and third conduit means for delivering gas to said pilot burner from the other of said chambers, each of said conduit means being provided with a valve for controlling the flow of gas therethrough, the valve of the third conduit means being thermostatically operated and the valves of the first and second conduit means being manually operated.

11. Thermostatic control mechanism for gas burners, comprising a main gas burner, a gas supply means, a flexible diaphragm valve controlling the flow of gas from said supply means to said main burner, a pair of gas receiving chambers separated by said diaphragm valve, means for delivering gas from one of said chambers to the other, a pilot burner, a conduit for delivering gas to said pilot burner from one of said chambers, and conduit means for delivering gas to said pilot burner from the other of said chambers, said conduit means including a flexible diaphragm valve for controlling the flow of gas therethrough.

12. Thermostatic control mechanism for gas burners, comprising a main gas burner, a gas supply means, a flexible imperforate diaphragm valve controlling the gas from said supply means to said main burner, a pair of gas receiving chambers separated by said imperforate diaphragm valve, first conduit means for delivering gas from one chamber to the other, a pilot burner, second conduit means for delivering gas to said pilot burner from one of said chambers, and third conduit means for delivering gas to said pilot burner from the other of said chambers, each of said conduit means being provided with a valve for controlling the flow of gas therethrough, the valve of one of said conduit means being thermostatically operated.

13. Thermostatic control mechanism for gas burners, comprising a main gas burner, a gas supply means, a flexible diaphragm valve controlling the flow of gas from said supply means to said main burner, a supply chamber on one side of said diaphragm valve in communication with said supply means, chamber means on the other side of said diaphragm valve, means for delivering gas from said supply chamber to said chamber means, a pilot burner, means for delivering gas from said supply chamber to said pilot burner, relay valve mechanism having a gas receiving chamber provided with two ports, gas delivery means leading from said chamber means to one of said ports, a flexible diaphragm valve for controlling the flow of gas through said port, thermostatic means for operating said last named diaphragm valve, and additional gas receiving means leading from the other of said ports to said pilot burner.

14. Thermostatic control mechanism for gas burners, comprising a main gas burner, a gas supply means, a flexible diaphragm valve controlling the flow of gas from said supply means to said main burner, a supply chamber on one side of said diaphragm valve in communication with said supply means, chamber means on the other side of said diaphragm valve, means for delivering gas from said supply chamber to said chamber means, a pilot burner, means for delivering gas from said supply chamber to said pilot burner, relay valve mechanism having a gas receiving chamber provided with two ports, gas delivery means leading from said chamber means to one of said ports, a flexible diaphragm valve for controlling the flow of gas through said port and forming one wall of the chamber of the relay valve mechanism, thermostatic means for operating said last named diaphragm valve, and additional gas receiving means leading from the other of said ports to said pilot burner.

15. Thermostatic control mechanism for gas burners, comprising a main gas burner, a gas supply means, a flexible diaphragm valve controlling the flow of gas from said supply means to said main burner, a supply chamber on one side of said diaphragm valve in communication with said supply means, chamber means on the other side of said diaphragm valve, means for delivering gas from said supply chamber to said chamber means, a pilot burner, means for delivering gas from said supply chamber to said pilot burner, relay valve mechanism having a gas receiving chamber provided with two ports of different size, gas delivery means leading from said chamber means to the larger one of said ports, a flexible diaphragm valve controlling the flow of gas through said port, thermostatic means for operating said last named diaphragm valve, and additional gas delivery means leading from the smaller port to said pilot burner.

16. Thermostatic control mechanism for gas burners, comprising a gas burner; controlling valve mechanism therefor having a supply chamber for receiving gas from a source of supply, a delivery chamber for receiving gas from said supply chamber and communicating with said burner so that gas can be delivered to said burner, a single imperforate valve for controlling communication between said supply and delivery chambers, a valve controlling chamber, conduit means between said supply and controlling chambers for providing constant communication therebetween, and valve means in said conduit means for controlling the flow of gas therethrough, the gas in said controlling chamber serving to close said valve; relay valve mechanism adapted for cooperation with said controlling valve mechanism and communicating with the controlling chamber of said controlling valve mechanism; and a thermostatic element effective upon said relay valve mechanism.

In testimony whereof I hereby affix my signature.

OTTO JOHN KUENHOLD.